US011195240B2

(12) United States Patent
Jee et al.

(10) Patent No.: US 11,195,240 B2
(45) Date of Patent: Dec. 7, 2021

(54) DEVICE FOR NOTIFYING MANAGER TERMINAL OF EVENT THAT HAS OCCURRED AT COFFEE MAKING DEVICE, AND OPERATION METHOD THEREFOR

(71) Applicant: DAL.KOMM CO., LTD, Seongnam-si (KR)

(72) Inventors: Sungwon Jee, Hanam-si (KR); Youngseok Kang, Incheon (KR); Woobeom Heo, Seoul (KR)

(73) Assignee: BEAT CORP. CO., LTD., Seongnam-si (KR)

( * ) Notice: Subject to any disclaimer, the term of this patent is extended or adjusted under 35 U.S.C. 154(b) by 88 days.

(21) Appl. No.: 16/613,805

(22) PCT Filed: Jan. 23, 2018

(86) PCT No.: PCT/KR2018/000998
§ 371 (c)(1),
(2) Date: Nov. 15, 2019

(87) PCT Pub. No.: WO2018/221826
PCT Pub. Date: Dec. 6, 2018

(65) Prior Publication Data
US 2020/0175619 A1    Jun. 4, 2020

(30) Foreign Application Priority Data
May 30, 2017   (KR) .......................... 10-2017-0066574

(51) Int. Cl.
*A47J 31/24*    (2006.01)
*G06Q 50/12*   (2012.01)
(Continued)

(52) U.S. Cl.
CPC ............ *G06Q 50/12* (2013.01); *A47J 31/521* (2018.08); *B25J 11/0045* (2013.01); *G06F 9/542* (2013.01);
(Continued)

(58) Field of Classification Search
CPC .......... A47J 31/521; A47J 31/24; G06Q 50/12
(Continued)

(56) References Cited

U.S. PATENT DOCUMENTS

2012/0097567 A1* 4/2012 Zhao ....................... G01F 23/18
                                                          206/459.1
2015/0315008 A1* 11/2015 Locke .................. B67D 1/0888
                                                             222/52
(Continued)

FOREIGN PATENT DOCUMENTS

JP         07-204096 A       8/1995
JP       2008-239051 A      10/2008
(Continued)

OTHER PUBLICATIONS

International Search Report in International Application No. PCT/KR2018/000998, dated Apr. 27, 2018, 2pages.

*Primary Examiner* — Luna Champagne
(74) *Attorney, Agent, or Firm* — Park, Kim & Suh, LLC

(57) ABSTRACT

A device for notifying a manager terminal of an event occurring in a coffee making device and an operating method thereof according to the present invention may enable a manager to visit an unmanned coffee shop only when a coffee making device needs to be managed and manage the coffee making device by determining that a first inventory shortage event for first inventory occurs when first inventory among the materials included in inventory data received from the coffee making device making coffee corresponding to each of the coffee menu items is larger than (Continued)

a first threshold inventory value and is equal to or less than a second threshold inventory value among threshold inventory values for the first inventory, determining that a second inventory shortage event for the first material occurs when the first inventory is equal to or less than the first threshold inventory value, transmitting an event occurrence message for the first inventory shortage event to a first manager terminal of a first manager who is a main manager of the coffee making device among a plurality of manager terminals, transmitting an event occurrence message for the second inventory shortage event to a second manager terminal of a second manager who is a senior manager of the first manger, and when an event occurrence confirmation message is not received from the first manager terminal within a predetermined first time after the event occurrence message for the first inventory shortage event is transmitted to the first manager terminal, transmitting the event occurrence message for the first inventory shortage event to the second manager terminal.

13 Claims, 2 Drawing Sheets

(51) Int. Cl.
*A47J 31/52* (2006.01)
*B25J 11/00* (2006.01)
*G06F 9/54* (2006.01)
*G06K 9/00* (2006.01)
*G06Q 10/08* (2012.01)
*G08B 21/18* (2006.01)
*G10L 25/51* (2013.01)
*H04N 7/18* (2006.01)

(52) U.S. Cl.
CPC ....... *G06K 9/00771* (2013.01); *G06Q 10/087* (2013.01); *G08B 21/182* (2013.01); *G10L 25/51* (2013.01); *H04N 7/18* (2013.01)

(58) Field of Classification Search
USPC .......................................................... 705/15
See application file for complete search history.

(56) References Cited

U.S. PATENT DOCUMENTS

2016/0324364 A1* 11/2016 De Mango ............ A47J 31/468
2017/0215632 A1* 8/2017 Tinkler ............... A47J 31/4492
2019/0359470 A1* 11/2019 Joshi ........................ G07F 9/026

FOREIGN PATENT DOCUMENTS

| JP | 2018073381 A | * | 5/2018 |
| KR | 10-2001-0010544 A | | 2/2001 |
| KR | 10-2011-0007284 A | | 1/2011 |
| KR | 10-2016-0134284 A | | 11/2016 |

* cited by examiner

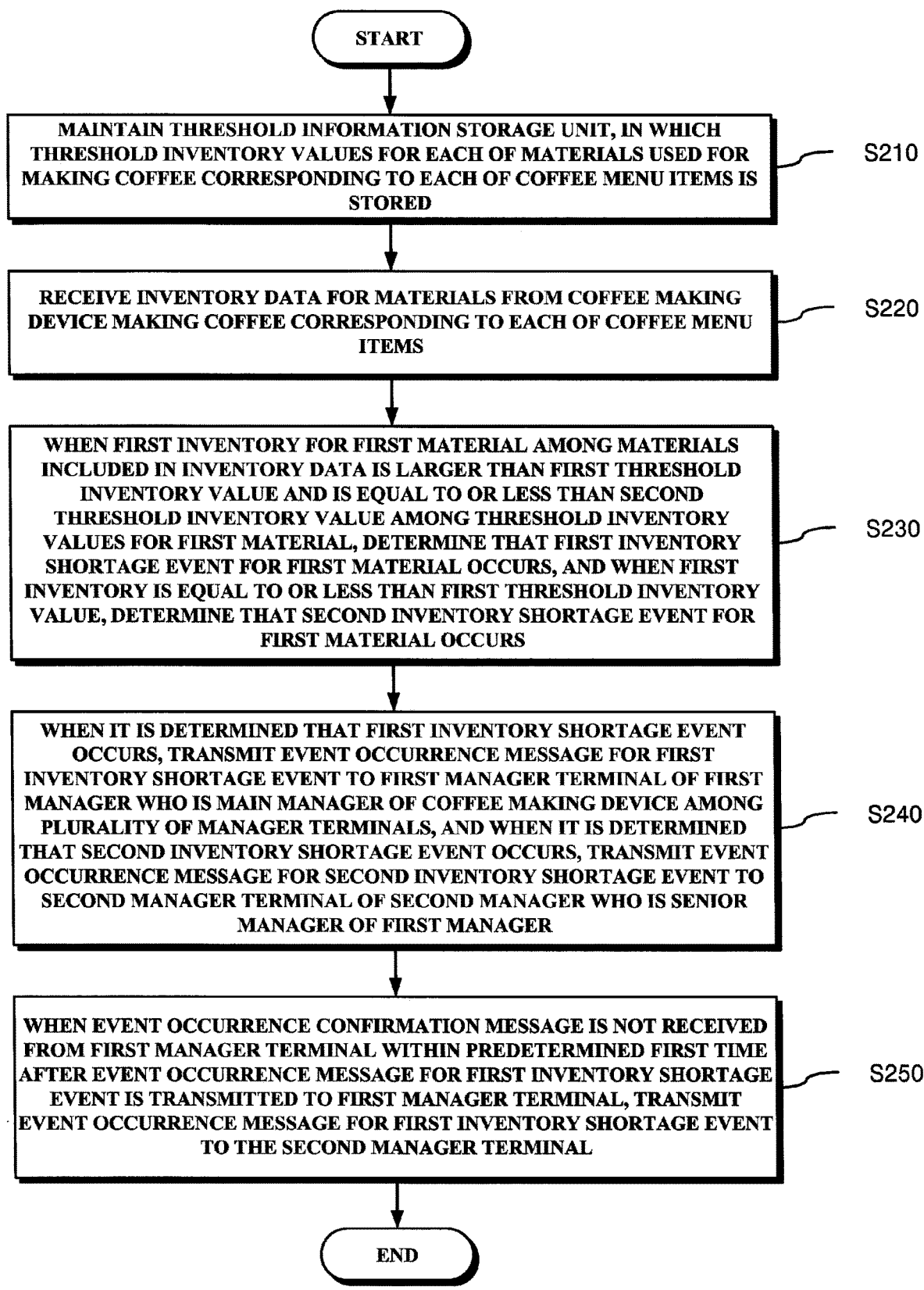

DEVICE FOR NOTIFYING MANAGER TERMINAL OF EVENT THAT HAS OCCURRED AT COFFEE MAKING DEVICE, AND OPERATION METHOD THEREFOR

CROSS-REFERENCE TO RELATED APPLICATIONS

This application is the National Stage filing under 35 U.S.C. 371 of International Application No. PCT/KR2018/000998, filed on Jan. 23, 2018, which claims the benefit of Korean Patent Application No. 10-2017-0066574, filed on May 30, 2017, the contents of which are all hereby incorporated by reference herein in their entirety.

TECHNICAL FIELD

The present invention relates to a technique for rapidly notifying a manager of a problem occurring in a coffee making device by notifying a manager terminal of various events occurring in the coffee making device.

BACKGROUND ART

As robot technology and artificial intelligence technology are developed, machine devices which are capable of mimicking human behaviors are being developed. As one example of the machine devices, there are automated coffee machines which discharge and mix materials according to predetermined ratios and prepare coffee, and coffee robots of which robot arms pick up and mix materials according to predetermined ratios to prepare coffee.

According to the development of the coffee robot, in order to maximize business profit by minimizing employees, such as a management staff and barista, an unmanned coffee shop in which a coffee robot which prepares coffee on behalf of a barista is placed has been launched.

However, the coffee robot placed in the unmanned coffee shop requires regular management like other machines, so that in order to manage the coffee robot, a manager needs to reside or visit the unmanned coffee shop regularly to manage the coffee robot.

That is, the unmanned coffee shop in which the coffee robot making coffee is placed achieves only the intended purpose of reducing preparing manpower, such as a barista, but has a problem in that the purpose of reducing the management staff is not actually achieved.

Accordingly, in order to minimize the management personnel, there is a need for an apparatus and a technique which enable a management staff to visit an unmanned coffee shop only when a coffee robot needs to be managed and manage the coffee robot.

DISCLOSURE

Technical Problem

A device for notifying a manager terminal of an event occurring in a coffee making device and an operating method thereof according to the present invention enable a manager to visit an unmanned coffee shop only when a coffee making device needs to be managed and manage the coffee making device by determining that a first inventory shortage event for a first material occurs when first inventory for the first material among the materials included in inventory data received from the coffee making device making coffee corresponding to each of the coffee menu items is larger than a first threshold inventory value and is equal to or less than a second threshold inventory value among threshold inventory values for the first inventory, determining that a second inventory shortage event for the first inventory occurs when the first inventory is equal to or less than the first threshold inventory value, transmitting an event occurrence message for the first inventory shortage event to a first manager terminal of a first manager who is a main manager of the coffee making device among a plurality of manager terminals, transmitting an event occurrence message for the second inventory shortage event to a second manager terminal of a second manager who is a senior manager of the first manger, and when an event occurrence confirmation message is not received from the first manager terminal within a predetermined first time after the event occurrence message for the first inventory shortage event is transmitted to the first manager terminal, transmitting the event occurrence message for the first inventory shortage event to the second manager terminal.

Technical Solution

An exemplary embodiment of the present invention provides a device for notifying a manager terminal of an event occurring in a coffee making device, the device including: a threshold information storage unit, which stores threshold inventory values for each of materials used for making coffee corresponding to each of coffee menu items; a data reception unit, which receives inventory data for the materials from the coffee making device making the coffee corresponding to each of the coffee menu items; an event occurrence determining unit, which when first inventory for a first material among the materials included in the inventory data is larger than a first threshold inventory value and is equal to or less than a second threshold inventory value among the threshold inventory values for the first material, determines that a first inventory shortage event for the first material occurs, and when the first inventory is equal to or less than the first threshold inventory value, determines that a second inventory shortage event for the first material occurs; and an event occurrence message transmission unit, which when it is determined that the first inventory shortage event occurs, transmits an event occurrence message for the first inventory shortage event to a first manager terminal of a first manager who is a main manager of the coffee making device among the plurality of manager terminals, and when it is determined that the second inventory shortage event occurs, transmits an event occurrence message for the second inventory shortage event to a second manager terminal of a second manager who is a senior manager of the first manager, in which when an event occurrence confirmation message is not received from the first manager terminal within a predetermined first time after the event occurrence message for the first inventory shortage event is transmitted to the first manager terminal, the event occurrence message transmission unit transmits the event occurrence message of the first inventory shortage event to the second manager terminal.

Another exemplary embodiment of the present invention provides a method of operating a device for notifying a manager terminal of an event occurring in a coffee making device, the method including: maintaining a threshold information storage unit, which stores threshold inventory values for each of materials used for making coffee corresponding to each of coffee menu items; receiving inventory data for the materials from the coffee making device making the coffee corresponding to each of the coffee menu items; when first inventory for a first material among the materials included in the inventory data is larger than a first threshold inventory value and is equal to or less than a second threshold inventory value among the threshold inventory values for the first material, determining that a first inventory shortage event for the first material occurs, and when the first inventory is equal to or less than the first threshold inventory value, determining that a second inventory shortage event for the first material occurs; when it is determined that the first inventory shortage event occurs, transmitting an event occurrence message for the first inventory shortage event to a first manager terminal of a first manager who is a main manager of the coffee making device among the plurality of manager terminals, and when it is determined that the second inventory shortage event occurs, transmitting an event occurrence message for the second inventory shortage event to a second manager terminal of a second manager who is a senior manager of the first manager; and when an event occurrence confirmation message is not received from the first manager terminal within a predetermined first time after the event occurrence message for the first inventory shortage event is transmitted to the first manager terminal, transmitting the event occurrence message of the first inventory shortage event to the second manager terminal.

Advantageous Effects

The device for notifying a manager terminal of an event occurring in a coffee making device and the operating method thereof according to the present invention may enable a manager to visit an unmanned coffee shop only when a coffee making device needs to be managed and manage the coffee making device by determining that a first inventory shortage event for a first material occurs when first inventory for the first material among the materials included in inventory data received from the coffee making device making coffee corresponding to each of the coffee menu items is larger than a first threshold inventory value and is equal to or less than a second threshold inventory value among threshold inventory values for the first inventory, determining that a second inventory shortage event for the first inventory occurs when the first inventory is equal to or less than the first threshold inventory value, transmitting an event occurrence message for the first inventory shortage event to a first manager terminal of a first manager who is a main manager of the coffee making device among a plurality of manager terminals, transmitting an event occurrence message for the second inventory shortage event to a second manager terminal of a second manager who is a senior manager of the first manger, and when an event occurrence confirmation message is not received from the first manager terminal within a predetermined first time after the event occurrence message for the first inventory shortage event is transmitted to the first manager terminal, transmitting the event occurrence message for the first inventory shortage event to the second manager terminal.

DESCRIPTION OF DRAWINGS

FIG. 2 is a flowchart illustrating a method of operating the device for notifying a manager terminal of an event occurring in a coffee making device according to an exemplary embodiment of the present invention.

MODE FOR CARRYING OUT THE INVENTION

Figure 1:
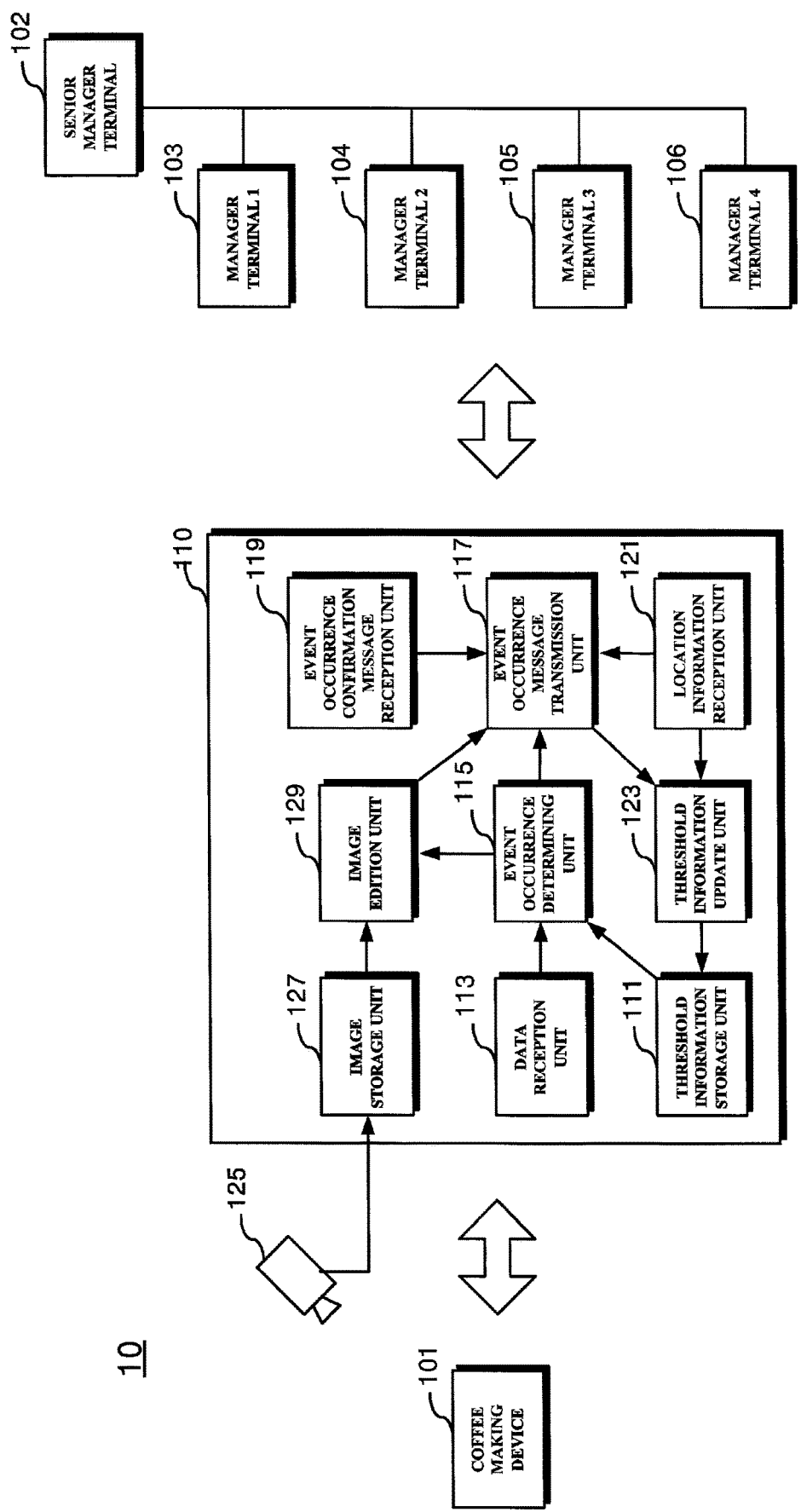
FIG. 1 is a diagram illustrating a structure of a coffee making device management system including a device for notifying a manager terminal of an event occurring in a coffee making device according to an exemplary embodiment of the present invention.

Hereinafter, exemplary embodiments of the present invention will be described in detail with reference to the accompanying drawings. The description is not intended to limit the present invention to the specific exemplary embodiments, and it will be appreciated that the present invention includes all modifications, equivalents, or substitutions included in the spirit and the technical scope of the present invention. In describing each drawing, similar reference numerals are used for similar constituent elements, and all terms used herein including technical or scientific terms have the same meanings as meanings which are generally understood by those skilled in the art unless they are differently defined.

Hereinafter, exemplary embodiments of the present invention will be described in detail with reference to the accompanying drawings.

FIG. 1 is a diagram illustrating a structure of a coffee making device management system 10 including a device 110 for notifying manager terminals 102 to 106 of an event occurring in a coffee making device 101 according to an exemplary embodiment of the present invention.

As illustrated in FIG. 1, the coffee making device management system 10 including the device 110 (hereinafter, referred to as the "notifying device") for notifying the manager terminals 102 to 106 of an event occurring in the coffee making device 101 according to an exemplary embodiment of the present invention includes the coffee making device 101, the plurality of manager terminals 102 to 106, and the notifying device 110.

First, the coffee making device 101 is the device making a coffee menu item in response to a coffee menu item making request received from a user terminal of a user, for example, an automated coffee machine, which discharges and mixes materials stored in a material storage box according to predetermined ratios and makes coffee, and a coffee robot, in which a robot arm picks up and then mixes materials stored in a material storage box according to predetermined ratios and makes coffee.

Next, the plurality of manager terminals 102 to 106 includes a senior manager terminal 102 of a senior manager managing a plurality of managers, manager terminal 1 103 of a main manager for the coffee making device 101, and manager terminals 2 to 4 104 to 106 of assistant managers for the coffee making device 101. Manager terminals 2 to 4 104 to 106 of the assistant managers for the coffee making device 101 may be set as main managers for another coffee making device, and accordingly, the main manager for the coffee making device 101 may be set as an assistant manager for another coffee making device.

Last, the notifying device 110 according to the exemplary embodiment of the present invention may include a threshold information storage unit 111, a data reception unit 113, an event occurrence determining unit 115, an event occurrence message transmission unit 117, an event occurrence confirmation message reception unit 119, a location information reception unit 121, a threshold information update unit 123, an image storage unit 127, and an image editing unit 129.

The threshold information storage unit 111 stores threshold inventory values of materials used for making coffee corresponding to each of the coffee menu items.

For example, the threshold information storage unit 111 may store threshold inventory values of materials used for making coffee corresponding to each of coffee menu items as represented in Table 1 below.

TABLE 1

| Material | First threshold inventory value (unit) | Second threshold inventory value (unit) | Third threshold inventory value (unit) |
|---|---|---|---|
| Coffee bean | 200 (g) | 300 (g) | 500 (g) |
| Milk | 1500 (ml) | 2500 (ml) | 5000 (ml) |
| Syrup | 50 (ml) | 150 (ml) | 300 (ml) |

Referring to Table 1, it can be seen that in the threshold information storage unit 111, as threshold inventory values for coffee bean, a first threshold inventory value is stored as 200 g, a second threshold inventory value is stored as 300 g, and a third threshold inventory value is stored as 500 g. Similarly, it can be seen that in the threshold information storage unit 111, as threshold inventory values for milk, a first threshold inventory value is stored as 1,500 ml, a first threshold inventory value is stored as 2,500 ml, and a third threshold inventory value is stored as 5,000 ml, and as threshold inventory values for syrup, a first threshold inventory value is stored as 50 ml, a second threshold inventory value is stored as 150 ml, and a third threshold inventory value is stored as 300 ml. In Table 1, it is illustrated that the materials include the coffee bean, the milk, and the syrup and the threshold inventory values are formed of three values, but this is merely an example, and more materials and more threshold inventory values for the materials may be stored in the threshold information storage unit 111.

Next, the data reception unit 113 regularly receives inventory data for the materials from the coffee making device 101. Herein, the coffee making device 101 may include a material storage box in which each of the materials used for making coffee corresponding to each of the coffee menu items is stored, and may generate inventory data for the materials stored in the material storage boxes by measuring weight of the materials stored in the material storage box.

For example, the data reception unit 113 may receive the inventory data from the coffee making device 101 whenever the coffee making device 101 completely makes the coffee menu item, or receive the inventory data from the coffee making device 101 whenever a predetermined time elapses. Herein, the predetermined time may be 30 seconds.

For example, the data reception unit 113 may receive the inventory data for the materials represented in Table 2 below from the coffee making device 101.

TABLE 2

| Material | Inventory (unit) |
|---|---|
| Coffee bean | 480 (g) |
| Milk | 6800 (ml) |
| Syrup | 450 (ml) |

Referring to Table 2, in the inventory data received by the data reception unit 113, information indicating that the inventory of the coffee bean among the materials from the coffee making device 101 is 480 g, the inventory of the milk is 6,800 ml, and the inventory of the syrup is 450 ml is recorded.

Next, the event occurrence determining unit 115 compares the inventory of each of the materials included in the inventory data with each of the threshold inventory values for the materials whenever the data reception unit 113 receives the inventory data.

For example, the event occurrence determining unit 115 compares the inventory of the coffee bean, the milk, and the syrup included in the inventory data received by the data reception unit 113 with each of the first to third threshold inventory values for the coffee bean, the milk, and the syrup.

Further, when the inventory of each of the materials included in the inventory data is larger than threshold inventory value 1 and is equal to or less than threshold inventory value 2 among the threshold inventory values for each of the materials, the event occurrence determining unit 115 determines that a first inventory shortage event for the material occurs, and when the first inventory is equal to or less than threshold inventory value 1, the event occurrence determining unit 115 determines that a second inventory shortage event for the first material occurs. However, when the inventory for each of the materials included in the inventory data is larger than threshold inventory value 2, the event occurrence determining unit 115 determines that the inventory shortage event for the material does not occur. Herein, threshold inventory value 1 may be the first threshold inventory value among the first to third threshold inventory values, and threshold inventory value 2 may be a third threshold inventory value having a higher value than threshold inventory value 1.

For example, in the situation illustrated in Tables 1 and 2, in the case where threshold inventory value 1 is the first threshold inventory value and threshold inventory value 2 is the third threshold inventory value, the inventory of the coffee bean is 480 g, which is larger than the first threshold inventory value (that is, 200 g) and is equal to or less than the third threshold inventory value (that is, 500 g) for the coffee bean, the event occurrence determining unit 115 determines that the first inventory shortage event occurs for the coffee bean. However, in the foregoing situation, the inventory of the milk and the syrup is 6,800 ml and 450 ml, which are larger than the third threshold inventory values (that is, 5,000 ml and 300 ml) for the milk and the syrup, so that the event occurrence determining unit 115 determines that the inventory shortage event for the milk and the syrup does not occur.

Next, when it is determined that the first inventory shortage event occurs, the event occurrence message transmission unit 117 transmits an event occurrence message for the first inventory shortage event to the manager terminal of the main manager of the coffee making device 101.

For example, when it is determined that the first inventory shortage event for the coffee bean occurs, the event occurrence message transmission unit 117 transmits an event occurrence message for the first inventory shortage event for the coffee bean to manager terminal 1 103 that is the manager terminal of the main manager of the coffee making device 101 among the plurality of manager terminals 102 to 106.

Further, when it is determined that the second inventory shortage event occurs, the event occurrence message transmission unit 117 transmits an event occurrence message for the second inventory shortage event to the manager terminal of the senior manager of the main manager. In the meantime, when it is determined that the second inventory shortage event occurs, the event occurrence message transmission unit 117 may also transmit an event occurrence message for the second inventory shortage event to both the manager terminal of the main manager of the coffee making device 101 and the manager terminal of the senior manager of the main manager.

For example, when it is determined that the second inventory shortage event for the coffee bean occurs, the event occurrence message transmission unit 117 transmits an event occurrence message for the second inventory shortage event for the coffee bean to the senior manager terminal 102. In the meantime, when it is determined that the second inventory shortage event for the coffee bean occurs, the event occurrence message transmission unit 117 may also transmit an event occurrence message for the second inventory shortage event for the coffee bean to both the manager terminal 1 103 that is the manager terminal of the main manager of the coffee making device 101 and the senior manager terminal 102.

The event occurrence confirmation message reception unit 119 may receive an event occurrence confirmation message from each of the plurality of manager terminals 102 to 106 as a response to the inventory shortage event transmitted to each of the plurality of manager terminals 102 to 106. For example, when the event occurrence message transmission unit 117 transmits the event occurrence message for the first inventory shortage event for the coffee bean to manager terminal 1 103, manager terminal 1 103 transmits the event occurrence confirmation message for the event occurrence message to the event occurrence confirmation message reception unit 119, so that the event occurrence confirmation message reception unit 119 may receive the event occurrence confirmation message.

In this case, when the event occurrence confirmation message reception unit 119 does not receive the event occurrence confirmation message from the manager terminal of the main manager within a predetermined first time after the event occurrence message transmission unit 117 transmits the event occurrence message for the first inventory shortage event to the manager terminal of the main manager of the coffee making device 101, the event occurrence message transmission unit 117 transmits the event occurrence message for the first inventory shortage event to the manager terminal of the senior manager. In the meantime, in the foregoing situation, the event occurrence message transmission unit 117 may also transmit the event occurrence message for the first inventory shortage event to both the manager terminal of the main manager and the manager terminal of the senior manager of the main manager. Herein, the predetermined first time may be, for example, five minutes.

Accordingly, the event occurrence message transmission unit 117 transmits the event occurrence message to each of the plurality of manager terminals 102 to 106 at the event occurrence time, so that at least one of the plurality of managers visits an unmanned coffee shop in which the coffee making device 101 is installed and manages the coffee making device 101 according to the event occurrence message.

Next, the location information reception unit 121 receives location information about each of the plurality of manager terminals 102 to 106 from each of the plurality of manager terminals 102 to 106. Herein, the location information may be the location information measured by a Global Positioning System (GPS), a Global Navigation Satellite System (GLONASS), a Wi-Fi based Positioning System (WPS), and the like.

The threshold information update unit 123 measures the time taken for at least one location information among the location information about the plurality of manager terminals 102 to 106 to be located within a predetermined first distance from the previously obtained location information of the coffee making device 101 after the event occurrence message transmission unit 117 transmits the event occurrence message for the first inventory shortage event to the manager terminal of the main manager of the coffee making device 101, compares the measured time and a predetermined target response time, and updates the threshold inventory values for each of the materials used for making the coffee corresponding to each of the coffee menu items stored in the threshold information storage unit. Herein, the predetermined first distance may be 30 m, and the predetermined target response time may be 20 minutes.

Particularly, when the measured time exceeds the predetermined target response time, the threshold information update unit 123 updates the threshold inventory values by adding an additive value proportional to the excess to the threshold inventory values, and when the measured time is less than the predetermined target response time, the threshold information update unit 123 updates the threshold inventory values by subtracting a subtractive value proportional to the shortage from the threshold inventory values.

For example, when the predetermined target response time is 30 minutes and it is measured that it takes 40 minutes for the location information about manager terminal 3 105 among the location information of the plurality of manager terminals 102 to 106 to be located within 30 m from the previously obtained location information of the coffee making device 101 after the event occurrence message transmission unit 117 transmits the event occurrence message for the first inventory shortage event to the manager terminal of the main manager of the coffee making device 101, the measured time of 40 minutes exceeds the predetermined target response time of 30 minutes, so that the threshold information update unit 123 updates each of the threshold inventory values by adding an additive value corresponding to ⅓ of each of the threshold inventory values to each of the threshold inventory values so that each of the threshold inventory values of each of the materials is increased by 4/3.

However, for example, when the predetermined target response time is 30 minutes and it is measured that it takes 20 minutes for the location information about manager terminal 1 103 among the location information of the plurality of manager terminals 102 to 106 to be located within 30 m from the previously obtained location information of the coffee making device 101 after the event occurrence message transmission unit 117 transmits the event occurrence message for the first inventory shortage event to the manager terminal of the main manager of the coffee making device 101, the measured time of 20 minutes is less than the predetermined target response time of 30 minutes, so that the threshold information update unit 123 updates each of the threshold inventory values by subtracting a subtractive value corresponding to ⅓ of each of the threshold inventory values from each of the threshold inventory values so that each of the threshold inventory values of each of the materials is decreased by ⅔.

Accordingly, the event occurrence determining unit 115 determines that the event occurs at an early time compared to the existing case, and thus the event occurrence message transmission unit is capable of transmitting the event occurrence message at an early time compared to the existing case, and finally, at least one of the plurality of managers visits the unmanned coffee shop in which the coffee making device 101 is installed in order to manage the coffee making device 101 within the predetermined target response time.

In the meantime, when the event occurrence confirmation message is not received in the event occurrence confirmation message reception unit 119 from the manager terminal of the main manager within a predetermined second time after the event occurrence message transmission unit 117 transmits the event occurrence message for the first inventory shortage event to the manager terminal of the main manager of the coffee making device 101, the event occurrence message transmission unit 117 checks a manager terminal most adjacent to the coffee making device 101 among the plurality of manager terminals 102 to 106 based on the location information about each of the plurality of manager terminals 102 to 106 and transmits an occurrence message of the first inventory shortage event to the most adjacent manager terminal. Further, when the most adjacent manager terminal is the manager terminal of the main manager, the event occurrence message transmission unit 117 may also transmit an occurrence message of the first inventory shortage event to the next adjacent manager terminal. Herein, the predetermined second time may be, for example, three minutes.

For example, when the event occurrence confirmation message is not received in the event occurrence confirmation message reception unit 119 from manager terminal 1 103 of the main manager within three minutes after the event occurrence message transmission unit 117 transmits the event occurrence message for the first inventory shortage event to the manager terminal 1 103 of the main manager, the event occurrence message transmission unit 117 checks a manager terminal most adjacent to the coffee making device 101 among the plurality of manager terminals 102 to 106 based on the location information about each of the plurality of manager terminals 102 to 106 and transmits an occurrence message of the first inventory shortage event to the most adjacent manager terminal. For example, when the most adjacent manager terminal to the coffee making device 101 is manager terminal 3 105, the event occurrence message transmission unit 117 transmits an occurrence message of the first inventory shortage event to manager terminal 3 105.

Next, the image storage unit 127 stores an image transmitted in real time from a closed circuit television 125 photographing the material storage box of the coffee making device 101.

When the event occurrence determining unit 115 determines that the inventory shortage event occurs, the image editing unit 129 captures an image of a current time point in the image stored in the image storage unit 127 and generates a captured image.

In this case, when the event occurrence message transmission unit 117 transmits the event occurrence message for the inventory shortage event to each of the plurality of manager terminals 102 to 106, the event occurrence message transmission unit 117 transmits the captured image together with the event occurrence message.

Accordingly, the manager of each of the plurality of manager terminals 102 to 106 may more precisely recognize a situation of the coffee making device 101 in response to the inventory shortage event.

In the notifying device 110 notifying the manager terminals 102 to 106 of the event occurring in the coffee making device 101 according to the exemplary embodiment of the present invention, the threshold information storage unit 111 may have stored threshold inclination values and threshold noise values for the coffee making device 101.

For example, threshold inclination values and threshold noise values for the coffee making device 101 may be stored in the threshold information storage unit 111 as represented in Table 3 below.

TABLE 3

| Category | First threshold value (unit) | Second threshold value (unit) | Third threshold value (unit) |
|---|---|---|---|
| Inclination | 5 (°) | 10 (°) | 15 (°) |
| Noise | 90 (dB) | 100 (dB) | 110 (dB) |

Referring to Table 3, it can be seen that in the threshold information storage unit 111, as the threshold inclination values for the coffee making device 101, a first threshold value is stored as 5°, a second threshold value is stored as 10°, and a third threshold value is stored as 15°, and as the threshold noise values for the coffee making device 101, a first threshold value is stored as 90 dB, a second threshold value is stored as 100 dB, and a third threshold value is stored as 110 dB.

The data reception unit 113 regularly receives inclination data and noise data including an inclination of the coffee making device 101 and a noise value around the coffee making device 101 measured by an inclination measurement sensor and a sound intensity measurement sensor attached to the coffee making device 101.

For example, the data reception unit 113 may receive inclination data and noise data represented in Table 4 below from the coffee making device 101.

TABLE 4

| Category | Intensity (unit) |
|---|---|
| Inclination | 0 (°) |
| Noise | 85 (dB) |

Referring to Table 4, the data reception unit 113 receives inclination data and noise data indicating that an inclination of the coffee making device 101 is 0° and noise around the coffee making device 101 is 85 dB from the coffee making device 101.

Next, the event occurrence determining unit 115 compares the inclination of the coffee making device 101 and the noise around the coffee making device 101 included in the inclination data and the noise data with the threshold inclination values and the threshold noise values whenever the data reception unit 113 receives the inclination data and the noise data.

Further, when the inclination and the noise included in the inclination data and the noise data are larger than threshold values 1 and are equal to or less than threshold values 2 among the threshold values for the inclination and the noise, respectively, the event occurrence determining unit 115 determines that a first danger event for the material occurs, and when the inclination and the noise are equal to or less than threshold values 1, respectively, the event occurrence determining unit 115 determines that a second danger event for each of the inclination and the noise occurs. However, when the inclination and the noise included in the inclination data and the noise data are larger than threshold values 2, respectively, the event occurrence determining unit 115 determines that a danger event for each of the inclination and the noise does not occur. Herein, threshold value 1 may be the first threshold value among the first to third threshold values, and threshold value 2 may be the third threshold value having a larger value than the first threshold value.

Next, when it is determined that the first danger event occurs, the event occurrence message transmission unit 117 transmits an event occurrence message for the first danger event to the manager terminal of the main manager of the coffee making device 101.

Further, when it is determined that the second danger event occurs, the event occurrence message transmission unit 117 transmits an event occurrence message for the second danger event to the manager terminal of the senior manager of the main manager. In the meantime, when it is determined that the second danger event occurs, the event occurrence message transmission unit 117 may also transmit an event occurrence message for the second danger event to the manager terminal of the main manager of the coffee making device 101 and the manager terminal of the senior manager of the main manager.

FIG. 2 is a flowchart illustrating a method of operating the device for notifying a manager terminal of an event occurring in a coffee making device according to an exemplary embodiment of the present invention.

Referring to FIG. 2, in operation S210, a threshold information storage unit, in which threshold inventory values for each of the materials used for making coffee corresponding to each of the coffee menu items are stored, is maintained.

In this case, in operation S210, an image storage unit, which stores an image transmitted in real time from a closed circuit television photographing a material storage box of the coffee making device, in which the materials are stored, may be maintained.

Further, in operation S210, the threshold information storage unit, in which threshold inclination values for the coffee making device are stored, may be maintained, and the threshold information storage unit, in which threshold noise values for the coffee making device are stored, may be maintained.

In operation S220, inventory data for the materials is received from the coffee making device making the coffee corresponding to each of the coffee menu items.

In this case, in operation S220, inclination data of the coffee making device may be received from the coffee making device, and measured noise data around the coffee making device may be received from the coffee making device.

In operation S230, when first inventory for a first material among the materials included in the inventory data is larger than a first threshold inventory value and is equal to or less than a second threshold inventory value among the threshold inventory values for the first material, it is determined that a first inventory shortage event for the first material occurs, and when the first inventory is equal to or less than the first threshold inventory value, it is determined that a second inventory shortage event for the first material occurs.

In this case, in operation S230, when it is determined that the inventory shortage event occurs, an image of a current time point may be captured from the image stored in the image storage unit to generate a captured image.

In operation S240, when it is determined that the first inventory shortage event occurs, an event occurrence message for the first inventory shortage event is transmitted to a first manager terminal of a first manager who is a main manager of the coffee making device among the plurality of manager terminals, and when it is determined that the second inventory shortage event occurs, an event occurrence message for the second inventory shortage event is transmitted to a second manager terminal of a second manager who is a senior manager of the first manager.

In this case, in operation S240, the captured image generated in operation S230 may be transmitted to each of the plurality of manager terminals together with the event occurrence message for the inventory shortage event.

In operation S250, when an event occurrence confirmation message is not received from the first manager terminal within a predetermined first time after the event occurrence message for the first inventory shortage event is transmitted to the first manager terminal, the event occurrence message for the first inventory shortage event is transmitted to the second manager terminal.

In this case, in operation S250, the captured image generated in operation S230 may be transmitted to each of the plurality of manager terminals together with the event occurrence message for the inventory shortage event.

After operation S240, the method may further include: checking a third manager terminal most adjacent to the coffee making device among the plurality of manager terminals based on location information about each of the plurality of terminals; and when the event transmission check message is not received from the first manager terminal within a predetermined second time after transmitting the event occurrence message for the first inventory shortage event to the first manager terminal, transmitting the event occurrence message for the first inventory shortage event to the third manager terminal. In this case, the first time may be longer than the second time.

Further, after operation S240, the method may further include: when an inclination of the coffee making device included in the inclination data is larger than a first threshold inclination value and is equal to or less than a second threshold inclination value among the threshold inclination values, determining that a first danger event occurs, and when the inclination of the coffee making device is equal to or less than the first threshold inclination value, determining that a second danger event occurs; and transmitting the event occurrence message for the first danger event to the first manager terminal among the plurality of manager terminals and transmitting the event occurrence message for the second danger event to the first manager terminal and the second manager terminal.

Further, after operation S240, the method may further include: when noise around the coffee making device included in the measured noise data is larger than a first threshold noise value and is equal to or less than a second threshold noise value among the threshold noise values, determining that a first noise event occurs, and when the noise around the coffee making device is equal to or less than the first threshold noise value, determining that a second noise event occurs; and transmitting the event occurrence message for the first noise event to the first manager terminal among the plurality of manager terminals and transmitting the event occurrence message for the second noise event to the first manager terminal and the second manager terminal.

In the foregoing, the method of operating the device for notifying the manager terminal of the event occurring in a coffee making device according to the exemplary embodiment of the present invention has been described with reference to FIG. 2. Herein, the method of operating the device for notifying the manager terminal of the event occurring in a coffee making device according to the exemplary embodiment of the present invention may correspond to the configuration of the operation of the device for notifying the manager terminal of the event occurring in a coffee making device according to the exemplary embodiment of the present invention described with reference to FIG. 1, so that a more detailed description will be omitted.

The method of operating the device for notifying the manager terminal of the event occurring in a coffee making device according to the exemplary embodiment of the present invention may be implemented by a computer program stored in a storage medium for executing the computer program through a combination with a computer.

Further, the method of operating the device for notifying the manager terminal of the event occurring in a coffee making device according to the exemplary embodiment of the present invention may be implemented in the form of a program command executable through various computer means and be recorded in a computer readable medium. The computer readable medium may include solely or a combination of a program command, a data file, a data structure, and the like. The program command recorded in the medium may be specially designed and configured for the present invention or may be published to those skilled in the computer software and usable. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. A device for notifying a manager terminal of an event occurring in a coffee making device, the device comprising:
 a threshold information storage unit, which stores threshold inventory values for each of materials used for making coffee corresponding to each of coffee menu items;
 a data reception unit, which receives inventory data for the materials from the coffee making device making the coffee corresponding to each of the coffee menu items;
 an event occurrence determining unit, which when first inventory for a first material among the materials included in the inventory data is larger than a first threshold inventory value and is equal to or less than a second threshold inventory value among the threshold inventory values for the first material, determines that a first inventory shortage event for the first material occurs, and when the first inventory is equal to or less than the first threshold inventory value, determines that a second inventory shortage event for the first material occurs;
 an event occurrence message transmission unit, which when it is determined that the first inventory shortage event occurs, transmits an event occurrence message for the first inventory shortage event to a first manager terminal of a first manager who is a main manager of the coffee making device among a plurality of manager terminals, and when it is determined that the second inventory shortage event occurs, transmits an event occurrence message for the second inventory shortage event to a second manager terminal of a second manager who is a senior manager of the first manager;
 a location information reception unit configured to receive location information of the plurality of manager terminals; and
 a threshold update unit configured to measure a manager response time using the location information of the plurality of manager terminals and to update the threshold inventory values based on a comparison between the measured manager response time and a target response time,
 wherein when an event occurrence confirmation message is not received from the first manager terminal within a predetermined first time after the event occurrence message for the first inventory shortage event is transmitted to the first manager terminal, the event occurrence message transmission unit transmits the event occurrence message of the first inventory shortage event to the second manager terminal.

2. The device of claim 1, further comprising:
 an adjacent manager terminal checking unit, which checks a third manager terminal most adjacent to the coffee making device among the plurality of manager terminals based on the location information of the plurality of manager terminals,
 wherein when the event occurrence confirmation message is not received from the first manager terminal within a predetermined second time after the event occurrence message for the first inventory shortage event is transmitted to the first manager terminal, the event occurrence message transmission unit transmits the event occurrence message for the first inventory shortage event to the third manager terminal, and
 the first time is longer than the second time.

3. The device of claim 2, further comprising:
 an image storage unit, which stores an image transmitted in real time from a closed circuit television photographing a material storage box of the coffee making device in which the materials are stored; and
 an image editing unit, which when the event occurrence determining unit determines that the inventory shortage event occurs, captures an image of a current time point in the image stored in the image storage unit and generates a captured image,
 wherein when the event occurrence message transmission unit transmits the event occurrence message for the inventory shortage event to each of the plurality of manager terminals, the event occurrence message transmission unit transmits the event occurrence message together with the captured image.

4. The device of claim 1, wherein the threshold information storage unit stores threshold inclination values for the coffee making device,
 the data reception unit receives inclination data of the coffee making device from the coffee making device,
 the event occurrence determining unit determines that a first danger event occurs when an inclination of the coffee making device included in the inclination data is larger than a first threshold inclination value and is equal to or less than a second threshold inclination value among the threshold inclination values, and determines that a second danger event occurs when the inclination of the coffee making device is equal to or less than the first threshold inclination value, and the event occurrence message transmission unit transmits an event occurrence message for the first danger event to the first manager terminal among the plurality of manager terminals, and transmits an event occurrence message for the second danger event to the first manager terminal and the second manager terminal.

5. The device of claim 1, wherein the threshold information storage unit stores threshold noise values for the coffee making device, the data reception unit receives measured noise data around the coffee making device from the coffee making device, the event occurrence determining unit determines that a first noise event occurs when noise around the coffee making device included in the measured noise data is larger than a first threshold noise value and is equal to or less than a second threshold noise value among the threshold noise values, and determines that a second noise event occurs when the noise around the coffee making device is equal to or less than the first threshold noise value, and the event occurrence message transmission unit transmits an event occurrence message for the first noise event to the first manager terminal among the plurality of manager terminals, and transmits an event occurrence message for the second noise event to the first manager terminal and the second manager terminal.

6. The device of claim 1, wherein the threshold update unit adds additive values to the threshold inventory values when the measured manager response time is greater than the target response time, the additive values being proportional to an excess to the threshold inventory values.

7. The device of claim 1, wherein the threshold update unit subtracts subtractive values from the threshold inventory values when the measured manager response time is less than the target response time, the subtractive values being proportional to a shortage from the threshold inventory values.

8. A method of operating a device for notifying a manager terminal of an event occurring in a coffee making device, the method comprising:

maintaining a threshold information storage unit, which stores threshold inventory values for each of materials used for making coffee corresponding to each of coffee menu items;

receiving inventory data for the materials from the coffee making device making the coffee corresponding to each of the coffee menu items;

when first inventory for a first material among the materials included in the inventory data is larger than a first threshold inventory value and is equal to or less than a second threshold inventory value among the threshold inventory values for the first material, determining that a first inventory shortage event for the first material occurs, and when the first inventory is equal to or less than the first threshold inventory value, determining that a second inventory shortage event for the first material occurs;

when it is determined that the first inventory shortage event occurs, transmitting an event occurrence message for the first inventory shortage event to a first manager terminal of a first manager who is a main manager of the coffee making device among the plurality of manager terminals, and when it is determined that the second inventory shortage event occurs, transmitting an event occurrence message for the second inventory shortage event to a second manager terminal of a second manager who is a senior manager of the first manager;

when an event occurrence confirmation message is not received from the first manager terminal within a predetermined first time after the event occurrence message for the first inventory shortage event is transmitted to the first manager terminal, transmitting the event occurrence message of the first inventory shortage event to the second manager terminal;

receiving location information of the plurality of manager terminals; and measuring a manager response time using the location information of the plurality of terminals and updating the threshold inventory values based on a comparison between the measured manager response time and a target response time.

9. The method of claim 8, further comprising:

checking a third manager terminal most adjacent to the coffee making device among the plurality of manager terminals based on the location information of the plurality of manager terminals; and when the event transmission check message is not received from the first manager terminal within a predetermined second time after the event occurrence message for the first inventory shortage event is transmitted to the first manager terminal, transmitting the event occurrence message for the first inventory shortage event to the third manager terminal, wherein the first time is longer than the second time.

10. The method of claim 9, further comprising:

maintaining an image storage unit, which stores an image transmitted in real time from a closed circuit television photographing a material storage box of the coffee making device in which the materials are stored;

when it is determined that the inventory shortage event occurs in the determining, capturing an image of a current time point in the image stored in the image storage unit and generating a captured image; and when the event occurrence message for the inventory shortage event is transmitted to each of the plurality of manager terminals, transmitting the event occurrence message together with the captured image.

11. The method of claim 8, further comprising:

maintaining the threshold information storage unit, which stores threshold inclination values for the coffee making device;

receiving inclination data of the coffee making device from the coffee making device;

determining that a first danger event occurs when an inclination of the coffee making device included in the inclination data is larger than a first threshold inclination value and is equal to or less than a second threshold inclination value among the threshold inclination values, and determining that a second danger event occurs when the inclination of the coffee making device is equal to or less than the first threshold inclination value; and transmitting an event occurrence message for the first danger event to the first manager terminal among the plurality of manager terminals, and transmitting an event occurrence message for the second danger event to the first manager terminal and the second manager terminal.

12. The method of claim 8, further comprising:

maintaining the threshold information storage unit, which stores threshold noise values for the coffee making device;

receiving measured noise data around the coffee making device from the coffee making device;

determining that a first noise event occurs when noise around the coffee making device included in the measured noise data is larger than a first threshold noise value and is equal to or less than a second threshold noise value among the threshold noise values, and determining that a second noise event occurs when the noise around the coffee making device is equal to or less than the first threshold noise value; and transmitting an event occurrence message for the first noise event to the first manager terminal among the plurality of manager terminals, and transmitting an event occurrence message for the second noise event to the first manager terminal and the second manager terminal.

13. A non-transitory computer readable recording medium having a program recorded therein for allowing a computer to execute a method of operating a device for notifying a manager terminal of an event occurring in a coffee making device, the method comprising:

maintaining a threshold information storage unit, which stores threshold inventory values for each of materials used for making coffee corresponding to each of coffee menu items;

receiving inventory data for the materials from the coffee making device making the coffee corresponding to each of the coffee menu items;

when first inventory for a first material among the materials included in the inventory data is larger than a first threshold inventory value and is equal to or less than a second threshold inventory value among the threshold inventory values for the first material, determining that a first inventory shortage event for the first material occurs, and when the first inventory is equal to or less than the first threshold inventory value, determining that a second inventory shortage event for the first material occurs;

when it is determined that the first inventory shortage event occurs, transmitting an event occurrence message for the first inventory shortage event to a first manager terminal of a first manager who is a main manager of the coffee making device among the plurality of manager terminals, and when it is determined that the second inventory shortage event occurs, transmitting an event occurrence message for the second inventory shortage event to a second manager terminal of a second manager who is a senior manager of the first manager;

when an event occurrence confirmation message is not received from the first manager terminal within a predetermined first time after the event occurrence message for the first inventory shortage event is transmitted to the first manager terminal, transmitting the event occurrence message of the first inventory shortage event to the second manager terminal;

receiving location information of the plurality of manager terminals; and measuring a manager response time using the location information of the plurality of manager terminals and updating the threshold inventory values based on a comparison between the measured manager response time and a target response time.

\* \* \* \* \*